W. BETZ.
AXLE JOURNAL.
APPLICATION FILED JAN. 4, 1908.
902,853.
Patented Nov. 3, 1908.
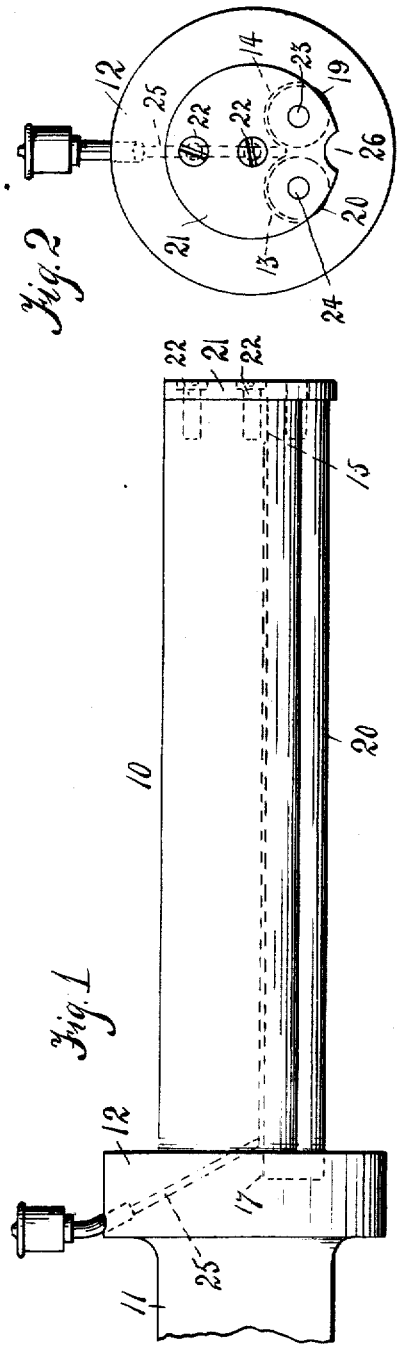
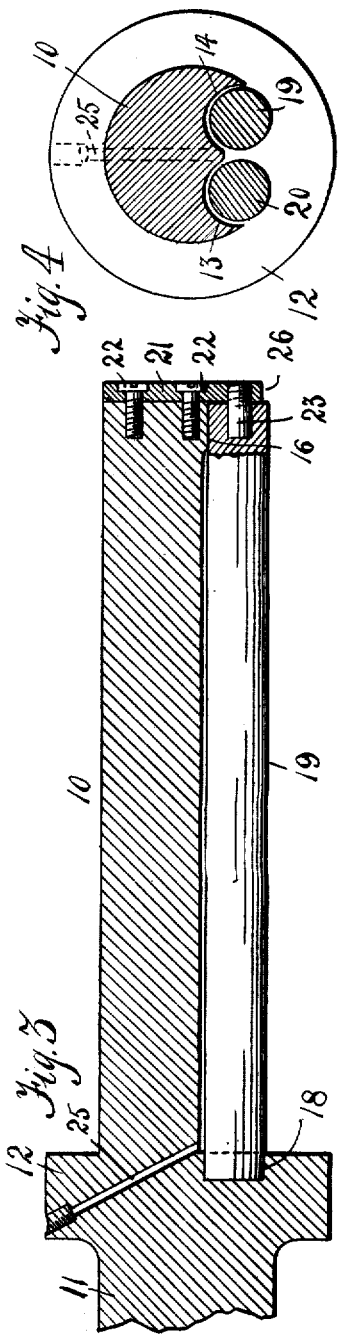
Witnesses,
M. R. Meacham
C. H. Woodward.
William Betz, Inventor,
By Shoemaker & Brown
Attys.

UNITED STATES PATENT OFFICE.

WILLIAM BETZ, OF WATAGA, ILLINOIS.

AXLE-JOURNAL.

No. 902,853.   Specification of Letters Patent.   Patented Nov. 3, 1908.

Application filed January 4, 1908. Serial No. 409,311.

*To all whom it may concern:*

Be it known that I, WILLIAM BETZ, a citizen of the United States, residing at Wataga, in the county of Knox and State of Illinois, have invented certain new and useful Improvements in Axle-Journals, of which the following is a specification.

This invention relates to improvements in vehicle axle journals, and has for one of its objects to improve the construction and increase the efficiency and utility of devices of this character.

Another object of the invention is to provide an axle journal in which provision is made for reducing the friction to a minimum without increasing the expense of manufacture, or the complication of the parts.

With these and other objects in view, the invention consists in certain novel features of construction as hereafter shown and described and specifically pointed out in the claims, and in the drawings is shown the preferred form of the embodiment of the invention, and in the drawings thus employed, Figure 1 is a side elevation of the improved device. Fig. 2 is an end elevation of the device. Fig. 3 is a longitudinal sectional elevation of the device. Fig. 4 is a transverse sectional view.

The improved device comprises a journal 10, of the usual length, adapted to be surrounded by an approved form of sleeve or skein, the journal formed on the end of an axle, a portion of which is represented at 11, and with an integral collar 12 between the axle and journal.

Formed in the lower side of the journal portion 10 are two semi-circular grooves 13—14, the grooves merging into each other and reduced at their outer ends to form half bearings 15—16. Extending into the collar 12 in alinement with the half bearings 15—16 are similar bearings 17—18, the half bearings 15—16 and the full bearings 17—18 being concentric with the grooves 13—14.

Fitting at one end into the bearings 17—18 are rollers 19—20, the opposite ends of the rollers fitting the bearings 15—16 with the outer ends of the rollers flush with the outer end of the journal 10.

Fitting upon the outer end of the journal 10 is a plate 21 secured in place upon the journal by any suitable means, such as screws 22 or other fastening devices. The outer ends of the rollers 19—20 are provided with bearing cavities, and fitting through the plate 21 are pins 23—24 engaging these bearing cavities, and thus rotatively supporting the outer ends of the rollers.

A conduit 25 is formed through the collar 12 and leading into the space between the rollers 19—20 adjacent to bearings 17—18, to provide means for the introduction of lubricating material, which thus flows between the rollers and along the grooves 13—14.

The plate 21 is provided with a cavity 26 in its lower side through which the surplus lubricating material flows.

The sleeve which surrounds the journal bearing 10 will be of any suitable construction, but preferably of that form shown in my co-pending application filed Aug. 5, 1907, Ser. No. 387,077. However, it will be understood that any form of sleeve or skein may be used in connection with the present invention.

The journal 10 may be of any size or length required to correspond to the wheel which is to be mounted thereon, and may be employed in connection with any of the various forms of vehicles in common use. The rollers 19—20 will preferably be of hardened steel, and, being disposed at the lower side of the journal bearing, receive the greatest pressure exerted downwardly upon the vehicle and thus relieve the body of the journal bearing largely of wear and friction. The rollers 19—20 extend the full length of the journal bearing, and this dispenses with the necessity for intermediate supports or division elements which would be required if the rollers were formed in parts. The expense of manufacture is thus reduced, and an axle journal produced which comprises the minimum number of parts with the maximum of efficiency and utility.

By this simple arrangement, if the rollers 19—20 require renewal, it is only necessary to detach the plate 21, withdraw the rollers and insert a new pair and replace the plate without the necessity for the removal of the axle from the journal, or otherwise disturbing the parts.

Having thus described the invention, what is claimed as new is:—

1. An axle journal having a lateral stop collar and also provided with longitudinal communicating grooves in its lower side, said journal also having half bearings at its outer end, said collar having full bearings in alinement with said half bearings, rollers extending the full length of the journal and bearing at the ends respectively in said full bearings and half bearings and provided with bearing cavities in their outer ends, a plate secured to the outer end of the journal, and pins bearing in said bearing cavities of the rollers, whereby the rollers are mounted for rotation in said grooves.

2. An axle journal having longitudinal communicating grooves in one side and half bearings at its outer end, said journal also having a laterally extending stop collar provided with a conduit communicating with the longitudinal grooves for the passage therethrough of lubricating material, said stop collar having full bearings in alinement with said half bearings, rollers mounted for rotation in said half bearings and full bearings and provided at their outer ends with bearing cavities, a plate detachably secured to the outer end of said journal, and pins carried by said plate and extending into said bearing cavities, said plate having an oil escape cavity.

3. An axle journal having longitudinal grooves in one side, and also having a laterally extending collar, the collar having bearings in alinement with said grooves, rollers disposed in said grooves and having their inner ends fitted in said bearings, the outer end of each roller having a cavity, a member secured to the outer end of the journal, and elements secured to said member and projecting into the cavities in the outer ends of the rollers.

In testimony whereof I affix my signature, in presence of two witnesses.

WILLIAM BETZ.

Witnesses:
ELMER W. BENNETT,
ELLA W. REECE.